United States Patent
Schweiger et al.

(10) Patent No.: US 11,594,368 B2
(45) Date of Patent: Feb. 28, 2023

(54) ASSEMBLY FOR CONNECTION TO A HIGH-VOLTAGE SYSTEM WITH ADJUSTABLE IMPEDANCE

(71) Applicant: Siemens Energy Global GmbH & Co. KG, Munich (DE)

(72) Inventors: Ewald Schweiger, Nuremberg (DE); Stefan Riegler, Graz (AT); Alfons-Karl Schrammel, Waldbach (AT)

(73) Assignee: Siemens Energy Global GmbH & Co. KG, Munich (DE)

( * ) Notice: Subject to any disclaimer, the term of this patent is extended or adjusted under 35 U.S.C. 154(b) by 403 days.

(21) Appl. No.: 16/644,257

(22) PCT Filed: Aug. 7, 2018

(86) PCT No.: PCT/EP2018/071323
§ 371 (c)(1),
(2) Date: Mar. 4, 2020

(87) PCT Pub. No.: WO2019/042716
PCT Pub. Date: Mar. 7, 2019

(65) Prior Publication Data
US 2020/0203066 A1   Jun. 25, 2020

(30) Foreign Application Priority Data
Sep. 4, 2017 (DE) .................... 10 2017 215 460.8

(51) Int. Cl.
*H01F 29/02* (2006.01)
*H01F 27/12* (2006.01)
(Continued)

(52) U.S. Cl.
CPC ............. *H01F 29/025* (2013.01); *G05F 1/12* (2013.01); *G05F 1/14* (2013.01); *G05F 1/24* (2013.01);
(Continued)

(58) Field of Classification Search
CPC ........ H01F 30/10; H01F 30/12; H01F 27/004; H01F 27/40; H01F 27/12; H01F 27/24;
(Continued)

(56) References Cited

U.S. PATENT DOCUMENTS 2,505,104 A * 4/1950 D'Orio .................. H01F 41/04
156/425
2,607,029 A    8/1952 Kesselring
(Continued)

FOREIGN PATENT DOCUMENTS

| CH | 155581 A | 6/1932 |
|----|----------|--------|
| CH | 231973 A | 4/1944 |

(Continued)

OTHER PUBLICATIONS

Wikipedia: "HVDC converter station"; archivieit am Mar. 8, 2016.
(Continued)

*Primary Examiner* — Thienvu V Tran
*Assistant Examiner* — Nusrat Quddus
(74) *Attorney, Agent, or Firm* — Laurence A. Greenberg; Werner H. Stemer; Ralph E. Locher

(57) ABSTRACT

An assembly for connection to a high-voltage system has multiple single-phase transformers each having a transformer tank which is filled with a fluid and in which a core with at least one winding is situated. At least some of the windings of the single-phase transformers are connected to one another, forming a neutral point. A short-circuit voltage curve or impedance of the assembly can be adapted to different requirements. The windings are each connected to the neutral point via a switchover unit and a choke winding. The choke winding has multiple tappings, and the switchover unit is configured to select the tapping via which the winding in question is connected to the neutral point.

11 Claims, 1 Drawing Sheet

(51) Int. Cl.
*H01F 27/24* (2006.01)
*H01F 27/28* (2006.01)
*H01F 27/40* (2006.01)
*H01F 30/10* (2006.01)
*H01R 13/53* (2006.01)
*G05F 1/12* (2006.01)
*G05F 1/14* (2006.01)
*G05F 1/24* (2006.01)
*H02M 5/10* (2006.01)

(52) U.S. Cl.
CPC ............. *H01F 27/12* (2013.01); *H01F 27/24* (2013.01); *H01F 27/28* (2013.01); *H01F 27/40* (2013.01); *H01F 30/10* (2013.01); *H01R 13/53* (2013.01); *H02M 5/10* (2013.01)

(58) Field of Classification Search
CPC ........ H01F 27/28; H01F 29/02; H01F 29/025; H01R 13/53; G05F 1/12; G05F 1/14; G05F 1/24; H02M 5/10
See application file for complete search history.

(56) References Cited

U.S. PATENT DOCUMENTS

| | | | | |
|---|---|---|---|---|
| 2,719,275 | A * | 9/1955 | Hartmann | H01F 37/00 336/105 |
| 3,235,323 | A | 2/1966 | Renberg | |
| 3,418,563 | A * | 12/1968 | Grosu | H01F 29/02 336/147 |
| 3,472,981 | A * | 10/1969 | Urbanek | H01H 9/0038 200/61.04 |
| 3,684,951 | A * | 8/1972 | Harrold | G01R 31/62 324/509 |
| 3,818,400 | A * | 6/1974 | Linnert | H01F 27/02 361/268 |
| 4,168,459 | A * | 9/1979 | Roesel, Jr. | H02K 21/046 322/29 |
| 4,174,509 | A * | 11/1979 | Bach | H01F 30/12 336/12 |
| 4,349,801 | A * | 9/1982 | Altmann | H01F 27/022 336/107 |
| 4,562,360 | A | 12/1985 | Fujimoto | |
| 6,696,925 | B1 * | 2/2004 | Aiello, Jr. | H01F 27/002 340/310.17 |
| 7,161,456 | B2 * | 1/2007 | Knox | H01F 27/385 336/90 |
| 8,300,382 | B2 * | 10/2012 | True | H01F 27/29 361/269 |
| 10,147,563 | B2 * | 12/2018 | Kaltenborn | H01F 27/02 |
| 10,418,814 | B2 * | 9/2019 | Munguia | H01F 27/29 |
| 10,666,038 | B2 * | 5/2020 | Inam | H02J 3/1807 |
| 2010/0090543 | A1 | 4/2010 | Cobb et al. | |
| 2012/0112730 | A1 * | 5/2012 | Brueckl | H01H 9/0044 323/343 |
| 2014/0327509 | A1 | 11/2014 | Lacerda | |
| 2017/0316864 | A1 * | 11/2017 | Ettl | H01F 27/04 |
| 2018/0115100 | A1 * | 4/2018 | Bachl | H01R 13/53 |
| 2018/0115121 | A1 * | 4/2018 | Neumueller | H01R 13/6683 |

FOREIGN PATENT DOCUMENTS

| | | |
|---|---|---|
| CN | 106169360 A | 11/2016 |
| CN | 106229990 A | 12/2016 |
| CN | 106653316 A | 5/2017 |
| DE | 855602 C | 11/1952 |
| DE | 3534843 * | 4/1987 |
| DE | 102007057017 A1 | 5/2009 |
| DE | 102012101988 A1 | 9/2013 |
| DE | 10 2012 109581 * | 4/2014 |
| EP | 2189990 * | 5/2010 |
| EP | 2797088 * | 10/2014 |
| FR | 125924 * | 4/2016 |
| GB | 191324162 A | 4/1914 |
| GB | 498756 A | 1/1939 |
| GB | 575450 A | 2/1946 |
| GB | 2464192 A | 4/2010 |
| WO | 2009065773 A1 | 5/2009 |
| WO | WO 2012 022397 * | 2/2012 |
| WO | 2013131663 A1 | 9/2013 |
| WO | 2014167205 A1 | 10/2014 |
| WO | WO2016101985 A1 | 6/2016 |

OTHER PUBLICATIONS

Mendrock Oswald: "Short-circuit current limitation by series reactors"; Trench; Austria; Zeitschrift ernergize; Transmission and Distribution; Oct. 2009; pp. 45-49.
Railing, B.D. (et al.) "Cross Sound Cable Project Second Generation VSC Technology for HVDC", B4-102 Session 2004, Cigré. Im Internet: http://search-ext.abb.com/library/Download.aspx?DocumentID=1JNL100097-7988LanguageCode=en&DocumentPartID=&Action=Launch (abgerufen am Aug. 29, 2011); 2004.
Elhand Transformatory "Transformers integrated with a choke"; 1.) Schnappschus des Internet Archive vom Sep. 9, 2016; 2.) Schnappschuss des Internet Archive vom Feb. 23, 2017; 3.) Schnappschuss des Internet Archive vom Jul. 5, 2017.
Bejing Power Equipment Group BPEG: "Dry Type Air Core Reactors"; Firmenschrift; 2003.
Brandt Andreas et al.: "Kurzschlussstrom und Stromveriuste reduzieren". Antriebs-und Schalttechnik; Zeitschrift etz; Heft Nov. 2010.
Siemens AG: "Transforming distance into daily life; Siemens Transformers; HVDC transformers ensure efficient energy flow";; 2012.
Wikipedia: "Leakage inductance"; archiviert am Aug. 5, 2017.
Yun Qinghua et al.:"Non-destructive testing", Labor Publishing House (Jan. 30, 1983).

* cited by examiner

ASSEMBLY FOR CONNECTION TO A HIGH-VOLTAGE SYSTEM WITH ADJUSTABLE IMPEDANCE

BACKGROUND OF THE INVENTION

Field of the Invention

The invention relates to an assembly for connection to a high-voltage system with multiple single-phase transformers, each of which has a transformer tank filled with a fluid in which a core with at least one winding is situated, wherein the windings of the single-phase transformers are at least partially connected together to one another forming a neutral point.

Such an assembly is known to the expert from standard practice. Assemblies that consist of three single-phase transformers are thus, for example, employed in high-voltage direct current transmission. The windings of the single-phase transformers are here connected to one another via external connecting cables, wherein, inter alia, a neutral point is formed. Each single-phase transformer has a tank at ground potential. A core with a core leg is situated inside the tank and is surrounded concentrically by an upper-voltage winding and a lower-voltage winding.

Depending on the design of their winding, transformers have a fixed impedance curve, which can also be referred to as the short-circuit voltage curve. Their place of application is defined for specific applications, for example inside a power supply network, on the basis of their short-circuit voltage curve.

SUMMARY OF THE INVENTION

The object of the invention is to provide an assembly of the type mentioned at the beginning, the short-circuit voltage curve of which or the impedance of which can be adjusted for different requirements.

The invention achieves this object in that each of the windings is connected to the neutral point via a switchover unit and a choke winding, wherein the choke winding has multiple tappings, and the changing unit is designed for selection of the tapping via which the respective winding is connected to the neutral point.

According to the invention the windings of the single-phase transformers are connected to one another forming a neutral point. In order to be able to change the impedance or the short-circuit voltage curve of the whole assembly, the current path between the windings and the neutral point comprises a choke and a switching unit with which the number of windings of the choke or choke winding in the current path between the transformer winding and the neutral point can be changed. One tapping of the choke winding enables, for example, a complete avoidance or what is known as a bypass of the choke, so that it is left without effect. Another tapping, in contrast, is for example connected to the upper winding of the choke, so that all the windings of the choke winding are connected in the current path between the transformer winding and the neutral point. In other words, in this position the choke exercises its maximum effect, so that the inductance of the total assembly is at its highest. A further tapping is, for example, connected to the middle winding of the choke.

The number of tappings of the choke winding is, in principle, arbitrary. The choke can be a toroidal-cored choke, a rod-cored choke, an air choke or the like according to the invention. The choke winding can, furthermore, comprise a ferromagnetic core. The core can consist of sheets insulated from one another or of a ferromagnetic powder in order to avoid eddy current losses as far as possible.

Particular advantages result if the transformer is what is known as a "wandering" or "resiliency" transformer, which can easily be transported and quickly assembled on site, so that it can be transported quickly from one place of use to another. The flexible impedance of the assembly thus significantly extends the spectrum of application of such a resiliency transformer or of such a resiliency assembly.

The switchover unit can, in principle, have any appropriate design in the context of the invention. According to one variant, the switchover unit is a power stepping switch or a load stepping switch. Stepping switches are available on the market. Their design is, in principle, known to the expert, so that a more detailed presentation of their design can be omitted at this point.

In contrast, the switchover unit is a reconnection unit that can only be switched when not under load. The switchover unit can be economical in design in the context of the invention. Flexible and fast adaptation of the impedance of the assembly is not always necessary in the context of the invention. If the assembly is, for example, set up at one location and has been set to a required impedance, a further, potentially dynamic, adjustment of the impedance is no longer necessary. Only if, after a few years, the assembly has to be moved to a different site of erection is it possible that the reconnection unit may have to be actuated again.

According to one preferred variant, the reconnection unit can therefore be actuated manually. When constructing or mounting the assembly on site it is possible, if the choke winding is situated in the transformer tank, for the transformer tank to be opened easily, for example using a hand-hole in the transformer tank located opposite the reconnection unit. The hand-hole therefore enables access to the reconnection unit.

The reconnection unit usually has a plurality of terminals in the form, for example, of pin shaped plug-contacts that can be connected to one another via a U-shaped cable connection. This U-shaped cable connection can be plugged manually onto selected connecting pins of the reconnection unit. Some terminals of the reconnection unit are connected here to an associated tapping of the choke.

Advantageously, the switchover unit and the choke winding are situated outside the transformer tank, and are connected via a cable connection to a winding or the windings of the transformer. According to this embodiment, the transformer can be conceived and manufactured independently of the choke and of the switchover unit. The switchover unit and the choke winding must, however, be conceived and manufactured as separate components. The choke winding is thus, for example, situated in a choke housing. The choke housing can be filled with insulating fluid or with air.

According to one preferred variant, the switchover unit and the choke winding are therefore situated inside the transformer tank. A compact assembly is made available in this way, and can be adapted flexibly to the respective requirement. The need to locate the choke winding in a special housing is, moreover, avoided.

As has already been explained, it is advantageous if the reconnection unit is situated inside the transformer tank, and faces an adjusting hand-hole in the lid of the transformer tank.

According to one different variant, the reconnection unit can be actuated electronically. With the aid of an electronic reconnection unit, the assembly according to the invention can be adapted particularly easily and, if necessary, also dynamically, to the respective installation location.

Advantageously, each transformer tank is fitted with at least one lead-through socket that holds a lead-through socket contact in an insulated manner at the transformer tank, where the lead-through socket contact is connected via a terminal connection to one of the windings. According to this variant, each single-phase transformer is fitted with pluggable lead-throughs, so that a fast installation of the assembly is possible on site. The lead-through socket is fastened here in a fluid-tight manner at the transformer tank 4. The lead-through socket comprises a socket wall that is manufactured of an electrically non-conducting material. The lead-through wall carries the lead-through socket contact which, viewed from the side, forms a closed end of the lead-through socket. The lead-through wall, which is open at one end, here borders an inner cone which, having a shape complementary to an outer cone, is designed as a high-voltage lead-through at the at the inlet side. The structure of the high-voltage lead-through is fundamentally known to the expert. Each lead-through thus comprises an inner conductor that extends in a longitudinal direction through a lead-through insulator. At the inlet side, the lead-through insulator forms the said outer cone which has a complementary shape matching the inner cone of the lead-through socket. The inlet side usually comprises a flexible layer of an electrically non-conductive material—e.g. silicone—at its outer side, so that the formation of air gaps after the insertion of the outer cone into the inner cone is avoided. A particularly tight joint is formed in this way, and the electrical strength of the inserted lead-through in the socket is increased.

It is furthermore advantageous if each transformer tank comprises a cable socket that holds a cable socket contact in an insulated manner at the transformer tank, wherein the cable socket contact is connected to a winding that lies at a high-voltage potential when in operation.

While one socket of the transformer tank is provided for the insertion of a high-voltage lead-through, there is another socket at the transformer tank that is designed with a shape complementary to a cable plug. The cable plug can be inserted into the plug socket with the complementary shape, so that a contact is established between the inner conductor of the cable and the cable socket contact, and thus with the winding of the respective transformer. The cable plug and the cable socket are designed for high voltages, and have the necessary dielectric strength for this purpose.

It is furthermore expedient if each transformer tank comprises a neutral point socket that holds a neutral point contact in an insulated manner at the transformer tank, wherein the neutral point contact is connected to at least one of the windings. According to this variant, the formation of the neutral point by means of a flexible cable connection is also enabled. The explanations that have been made regarding the lead-through socket and the cable plug also apply here in a corresponding manner.

It is also expedient if each single-phase transformer is of modular design, and comprises a tank module, an expansion container module and a cooling module, wherein the said modules are connected to one another in a releasable manner.

The modules of this transformer can be transported independently of one another. The modules are, moreover, already at least partially filled with an insulating fluid, such as a mineral or ester oil. Suitable oil valves serve to securely close the respective modules during transport. During assembly, the modules are connected to one another via connecting line, wherein venting openings can be provided in the connecting line for the application of a vacuum. If, for example, one output of the tank module is connected over a connecting line to the input of the cooling module, and if the connecting line is evacuated, the valves of the transformer tank and the cooling module can be opened, so that the insulating fluid can be transferred out of the transformer into the cooling module, wherein the risk of air contamination or moisture is avoided through the evacuation of the intermediate line.

Further expedient embodiments and advantages of the invention are the object of the following description of exemplary embodiments of the invention with reference to the figures of the drawing, wherein the same reference signs refer to components having the same effect, and where

DETAILED DESCRIPTION OF THE INVENTION

Figure 1:
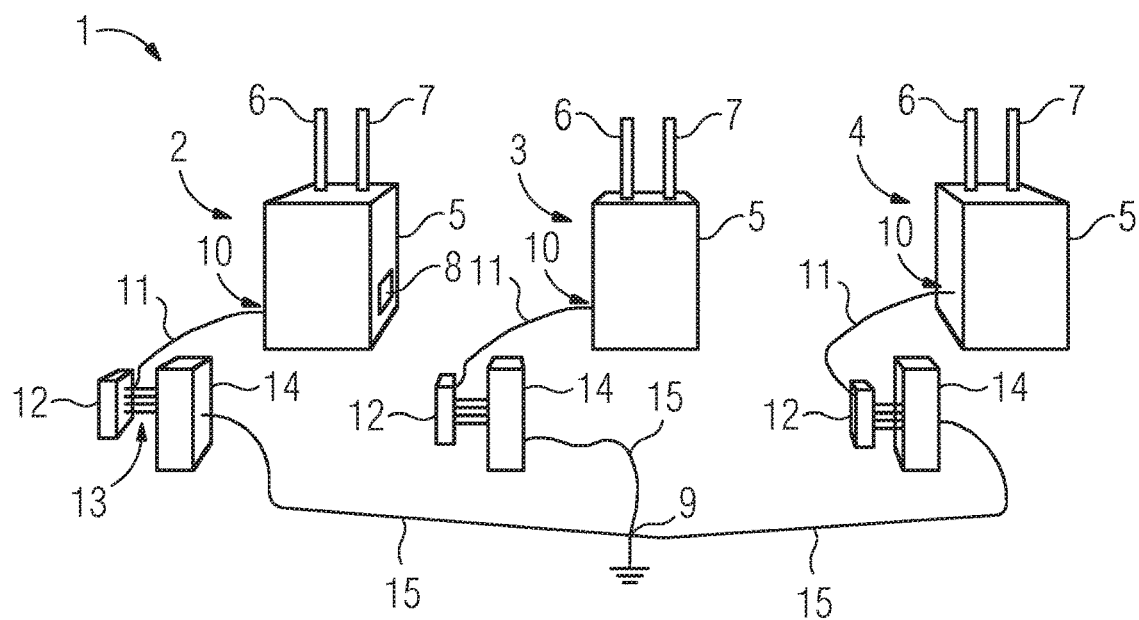
FIG. 1 shows a schematic illustration of an exemplary embodiment of the assembly according to the invention.

FIG. 1 shows a schematic illustration of an exemplary embodiment of the assembly according to the invention 1 comprising three single-phase transformers 2, 3 and 4. Each of the single-phase transformers here is only illustrated schematically and only by the respective transformer tank 5 and the two high-voltage lead-throughs 6 and 7. A high-voltage cable outlet 8 can also be recognized. Further components of the single-phase transformers 2, 3 and 4, such as for example the cooling module, compensating vessel module and the like are not illustrated for the sake of clarity.

It should be pointed out that, in addition to the two high-voltage lead-throughs illustrated, each single-phase transformer can also comprise further high-voltage lead-throughs as inlet and/or as outlet.

The high-voltage lead-throughs 6 and 7 illustrated are designed for different input voltages. The high-voltage lead-through 6 can for example thus be connected to an overhead line via an overhead connection terminal that is designed for voltages of around 350 kV. The high-voltage lead-through 7 is used at lower input voltages, for example overhead lines in the general order of 180 or 230 kV. The high-voltage lead-through 6 can then be dismantled. Each high-voltage lead-through 6 or 7 is designed as a pluggable lead-through. Each high-voltage lead-through 6 or 7 here comprises a conically shaped inlet side that is designed with a complementary shape to a lead-through socket. The lead-through socket is fastened in a fluid-tight manner at an opening in the tank as what is known as a device connector part. A fastening flange of the lead-through socket is, for example, suitable for this purpose. A socket wall protrudes from the fastening flange into the interior of the transformer tank, while a lead-through socket contact, into which the insertion contact of the lead-through can be inserted, is held in an insulated manner at the closed end of the lead-through socket. The inner wall of the lead-through socket borders an inner cone the shape of which is designed to be complementary to the outer cone of the socket.

In the exemplary embodiment illustrated, the single-phase transformers each comprise two windings in the form of a lower-voltage winding and an upper-voltage winding. The two windings are connected at one end to a common neutral point 9. Each transformer tank 5 comprises a neutral point socket 10 for this purpose, into which the plug of an interconnecting cable 11 is inserted. Due to this plug connection, the inner conductor of the interconnecting cable 11 is connected to the end of the high-voltage and lower-voltage windings inside the transformer tank 5. The interconnecting cable is connected at its end facing away from the neutral point socket 10 to a switching unit 12 that is designed in FIG. 1 as a stepping switch. Each of the stepping switches 12 comprises a plurality of outlet contacts that are connected via connecting lines 13 to tappings of a choke winding. The choke winding is situated in a choke housing 14 and is connected at the output to the neutral point 9 via the neutral point cable 15. The switching unit 12 is designed such that the contact that is connected to the inner conductor of the interconnecting cable 12 can be connected, depending on the switch position, to one of the connecting lines 13 and thus to one of the tappings of the choke winding 14.

The impedance of the total assembly can in this way be adjusted flexibly to the respective requirements.

Figure 2:
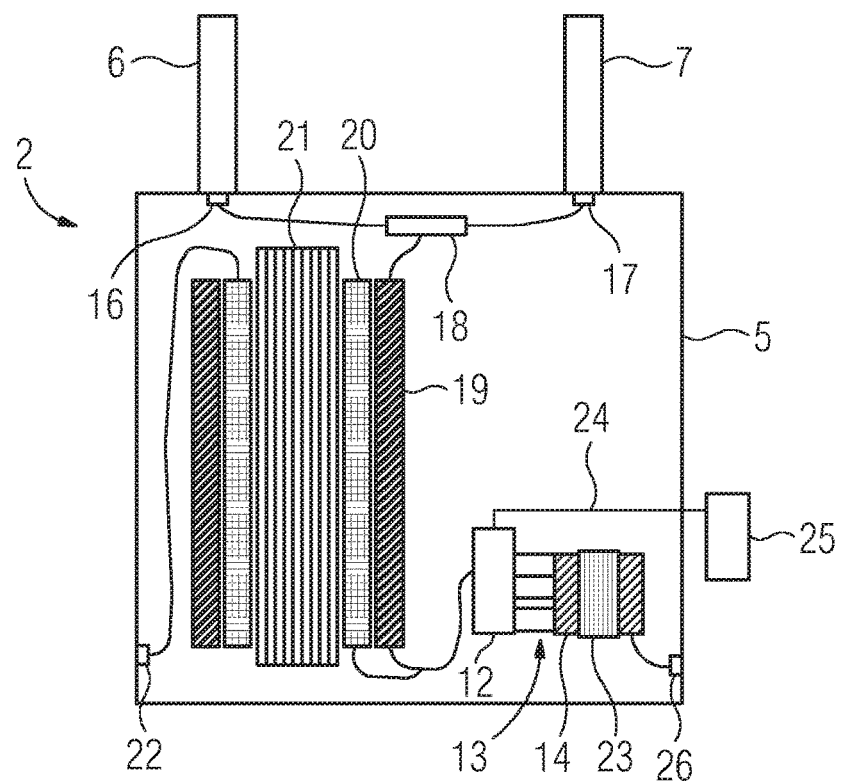
FIG. 2 shows a partially sectional side view of the single-phase transformer of the assembly according to FIG. 1.

FIG. 2 shows a single-phase transformer 2 for a further example of the assembly according to the invention. Only one of the single-phase transformers of the assembly is illustrated in FIG. 2. The other single-phase transformers are, however, identically implemented.

It can be recognized in this illustration that the transformer 2 comprises a transformer tank 5 as well as the two high-voltage lead-throughs 6 and 7, each of which is connected through its inner conductor to a lead-through socket 16 or 17. The respective lead-through socket 16, 17 is connected via an input selection plug unit 18 to an upper-voltage winding 19 of the single-phase transformer 2. The input selection plug unit can be actuated manually in such a way that either the lead-through socket 16 or the lead-through socket 17 is connected to the upper-voltage winding 19. The upper-voltage winding 19 surrounds a lower-voltage winding 20, where both windings 19 and 20 are situated concentrically with respect to a core leg 21 of a core that is not otherwise further shown. The lower-voltage winding 20 is connected to a cable socket 22 at which the desired output high voltage, for example a voltage of about 130 kV, can be tapped. A cable plug appropriate for the cable socket is to be inserted for this purpose into the cable socket 22.

In the variant of the invention illustrated in FIG. 2, the choke winding of the choke 14 and the switching unit 12 are situated in the interior of the transformer tank 5. In addition to this it can be recognized in FIG. 2 that the choke winding is situated concentrically around a soft-magnetic iron core 23. In order to be able to actuate the switching unit 12 from the outside, it is connected via an appropriate force transfer mechanism 24 such as, for example, shafts, levers, gears or the like, to a selection unit 25 situated outside the transformer tank 5. This selection unit 25 makes it possible by means of the mechanism 24 to connect contacts of the switching unit 12 to one another in such a way that the desired tapping of the choke winding 14 is connected to the end of the upper-voltage and lower-voltage windings 19 and 20 at the neutral point end.

The invention claimed is:
1. An assembly for connection to a high-voltage system, the assembly comprising:

a plurality of single-phase transformers each having a transformer tank filled with a fluid and a core with at least one core winding disposed in said transformer tank;
a neutral point;
a switchover unit and a choke winding connecting said at least one core winding of each of said cores to said neutral point;
said choke winding having multiple tappings and said switchover unit being configured to select a respective one of said tappings through which the respective core winding of said core is connected to said neutral point; and
wherein each of said transformer tanks is fitted with at least one lead-through socket that holds a lead-through socket contact in an insulated manner at said transformer tank, and wherein a lead-through socket contact is connected via a terminal connection to said at least one core winding.

2. The assembly according to claim 1, wherein said switchover unit is a power stepping switch or a load stepping switch.

3. The assembly according to claim 1, wherein said switchover unit is a reconnection unit that can only be switched when not under load.

4. The assembly according to claim 3, wherein said reconnection unit is configured for manual actuation.

5. The assembly according to claim 1, wherein said switchover unit and said choke winding are situated outside said transformer tank and are connected to said at least one core winding via a cable connection.

6. The assembly according to claim 1, wherein said switchover unit and said choke winding are situated inside said transformer tank.

7. The assembly according to claim 6, wherein said switchover unit is a reconnection unit situated inside said transformer tank and is disposed to face an adjusting handhole in a lid of said transformer tank.

8. The assembly according to claim 1, wherein said switchover unit is a reconnection unit configured for electronic actuation.

9. An assembly for connection to a high-voltage system, the assembly comprising:
a plurality of single-phase transformers each having a transformer tank filled with a fluid and a core with at least one core winding disposed in said transformer tank:
a neutral point;
a switchover unit and a choke winding connecting said at least one core winding of each of said cores to said neutral point;
said choke winding having multiple tappings and said switchover unit being configured to select a respective one of said tappings through which the respective core winding of said core is connected to said neutral point;
wherein each of said transformer tanks comprises a cable socket that holds a cable socket contact in an insulated manner at said transformer tank, and wherein said cable socket contact is connected to said at least one core winding.

10. An assembly for connection to a high-voltage system, the assembly comprising:
a plurality of single-phase transformers each having a transformer tank filled with a fluid and a core with at least one core winding disposed in said transformer tank:
a neutral point;

a switchover unit and a choke winding connecting said at least one core winding of each of said cores to said neutral point;

said choke winding having multiple tappings and said switchover unit being configured to select a respective one of said tappings through which the respective core winding of said core is connected to said neutral point;

wherein each said transformer tank comprises a neutral point socket that holds a neutral point contact in an insulated manner at the transformer tank, wherein the neutral point contact is connected to at least one of said core windings.

11. The assembly according to claim 1, wherein each said single-phase transformer is a modular transformer having a plurality of modules, including a tank module, an expansion container module, and a cooling module, and wherein said modules are releasably connected to one another.

* * * * *